Feb. 26, 1924.                                              1,485,189
G. R. KELTIE
WRINGER ROLL
Filed Feb. 17, 1923
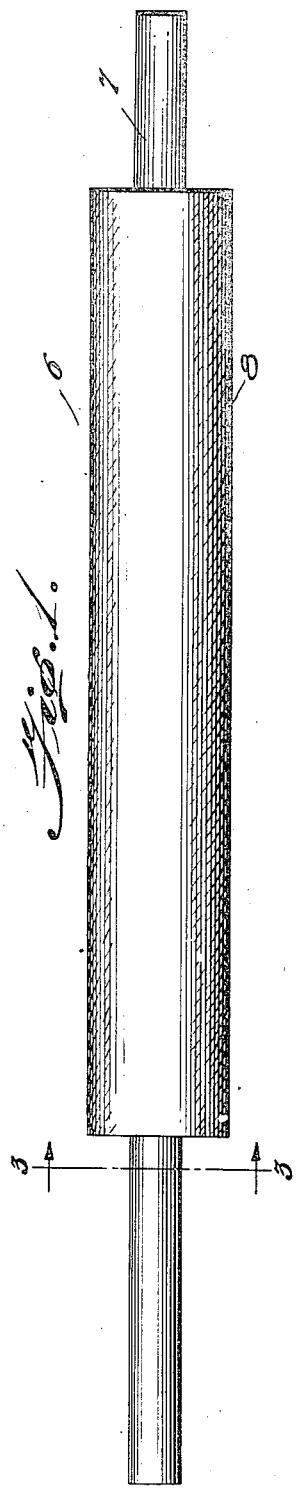
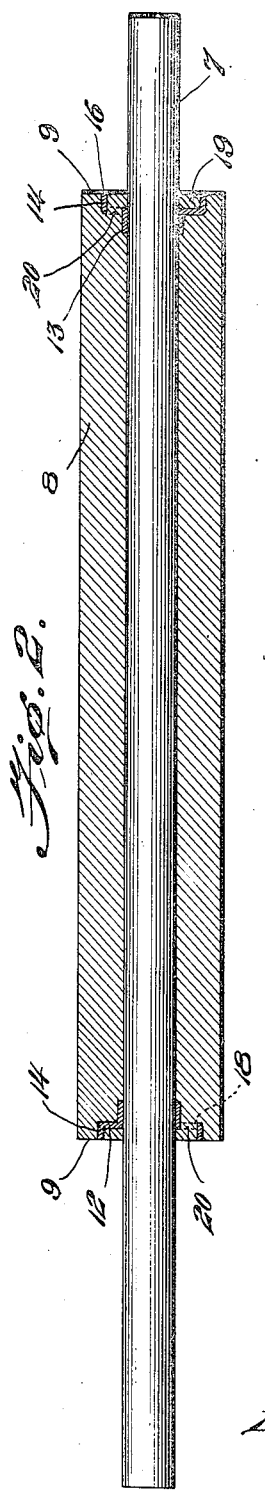
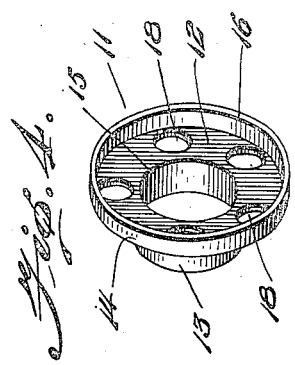
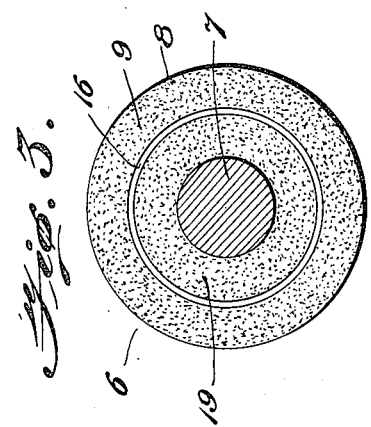
Inventor
George R. Keltie
By Horatio E. Bellows
Attorney Patented Feb. 26, 1924.

1,485,189

UNITED STATES PATENT OFFICE.

GEORGE R. KELTIE, OF WOONSOCKET, RHODE ISLAND, ASSIGNOR, BY MESNE ASSIGNMENTS, TO AMERICAN WRINGER COMPANY, INC.

WRINGER ROLL.

Application filed February 17, 1923. Serial No. 619,548.

*To all whom it may concern:*

Be it known that I, GEORGE R. KELTIE, a citizen of the United States, residing at Woonsocket, in the county of Providence and State of Rhode Island, have invented certain new and useful Improvements in Wringer Rolls, of which the following is a specification.

My invention relates to that type of roll which is used in wringers.

In this type of rolls the body thereof is of rubber, or rubber compounds, or rubberized fabrics fast to a shaft of steel or similar metal, which is mounted or journaled in the side bars of the wringer frame or in plates attached to the side bars.

Important objects of my invention are to prevent end wear of the roll body against the side bars or plates of the frame, to stiffen the body at its ends, and to insure a firm union of the body with the shaft.

A further object is to avoid the presence of rust, which frequently ruins the clothes passing through the wringer when exposed washers upon the shaft abut against the ends of the body.

Another object is to attain these ends in a structure which lends itself to an inexpensive construction.

To the above ends essentially my invention consists in such parts and in such combinations of parts, and in such steps and in such successions of steps as falls within the scope of the appended claims.

In the accompanying drawings which form a part of this specification, and which shows one approved form of my invention—

Figure 1 is a side elevation of my improved roll,

Figure 2, a central longitudinal section of the same,

Figure 3, a section on line 3—3 of Figure 1, and

Figure 4, an isometric view of the disk member.

Like reference characters indicate like parts throughout the views.

In the form of my invention herein shown the roll 6 comprises the usual steel or metal shaft 7 adapted for rotation in the side bars of a wringer, and 8 the body of rubber, rubber compound, or rubberized fabric fast to the shaft, and having end faces 9.

Imbedded in the body 8, adjacent each end, is a cup shaped washer indicated generally by 11 comprising an annular body or disk 12, an inwardly directed central collar 13, and a peripheral outwardly directed annular flange 14 equidistant at all points from the opening 15 of the collar. The edge or end face 16 of the flange is preferably flat and smooth. Each member 11 has its portion 13 welded to the shaft 7, and its flange 14 is concentric with the shaft and parallel with the portion 13. The material of the roll 8 entirely encloses the members 11 except the faces 16 of the flange 14 which are flush with the faces 9 of the roll. This annular exposed portion is clearly shown in Figure 3.

If desired, the portion 12 of each member 11 may be provided with an annular series of holes 18. When such holes are present the expense of constructing my roll is less than when they are absent.

In constructing the roll the members 11 are first welded to the shaft 7, and the rubber is then wrapped around the shaft between and over the members 11, and placed in the mold where the rubber is heated and fused. Thereafter, if the holes 18 are absent, an annular button of rubber is inserted in the hollow of each member 11 and then heated or vulcanized in place, forming the portion 19, which is a constituent part of the body 8. When the holes 18 are present, the step of introducing a button may be omitted, because when the body 8 is being fused in the mold, the fused material flows through the holes 18 and fills the interior of the member 11. Thus when the molding operation is complete the portion 19, and the portions 20 in the holes 18, constitute integral parts of the body.

In either instance, however, each completed roll leaves exposed of the metal member 11 only the narrow annular face 16 so that the possibility of rust is reduced to a minimum. At the same time said metallic face affords a protective bearing area against the adjacent side strip of the frame and thus protects the softer end face of the roll from wear. Furthermore the shape of each member 11 and its position within the roll body supports and strengthens the latter, and insures a closer engagement of the body with the shaft.

I claim:—

1. In a wringer roll, a metal shaft, a rubber body on the shaft, and means embedded in said body and fast on the shaft and having peripheral portions embedded in the ends of the body and extending lengthwise thereof and terminating substantially at the ends of the roll.

2. In a wringer roll, a shaft, a rubber body on the shaft, and members comprising collars enclosed by the body and fast to the shaft, disks on the collars also enclosed by the body, and lateral flanges on the disks and within the body having their free edges exposed in the end faces of the body.

3. In a wringer roll, a shaft, a rubber body on the shaft, and hollow members upon the shaft bodily embedded within the body with end portions only exposed at the ends of the body, said members being provided with perforations with portions of the body extended therethrough.

4. In a wringer roll, a shaft, cup shaped members spaced from each other on the shaft provided with holes and having their hollow portions outwardly directed and terminating substantially at the end faces of the roll, and a rubber body on the shaft comprising a portion surrounding the members, a portion within the members, and intermediate connecting portions passing through the holes.

5. In a wringer roll, a shaft, a rubber body on the shaft, and discs on the shaft embedded within the body, said discs having lateral flanges embedded within the body, said flanges having their free edges exposed at the end faces of the roll body.

In testimony whereof I have affixed my signature.

GEORGE R. KELTIE.